April 5, 1949.　　　　M. C. TOWNSEND　　　　2,466,135
WATERING FOUNTAIN
Filed April 15, 1944　　　　　　　　　　2 Sheets-Sheet 1
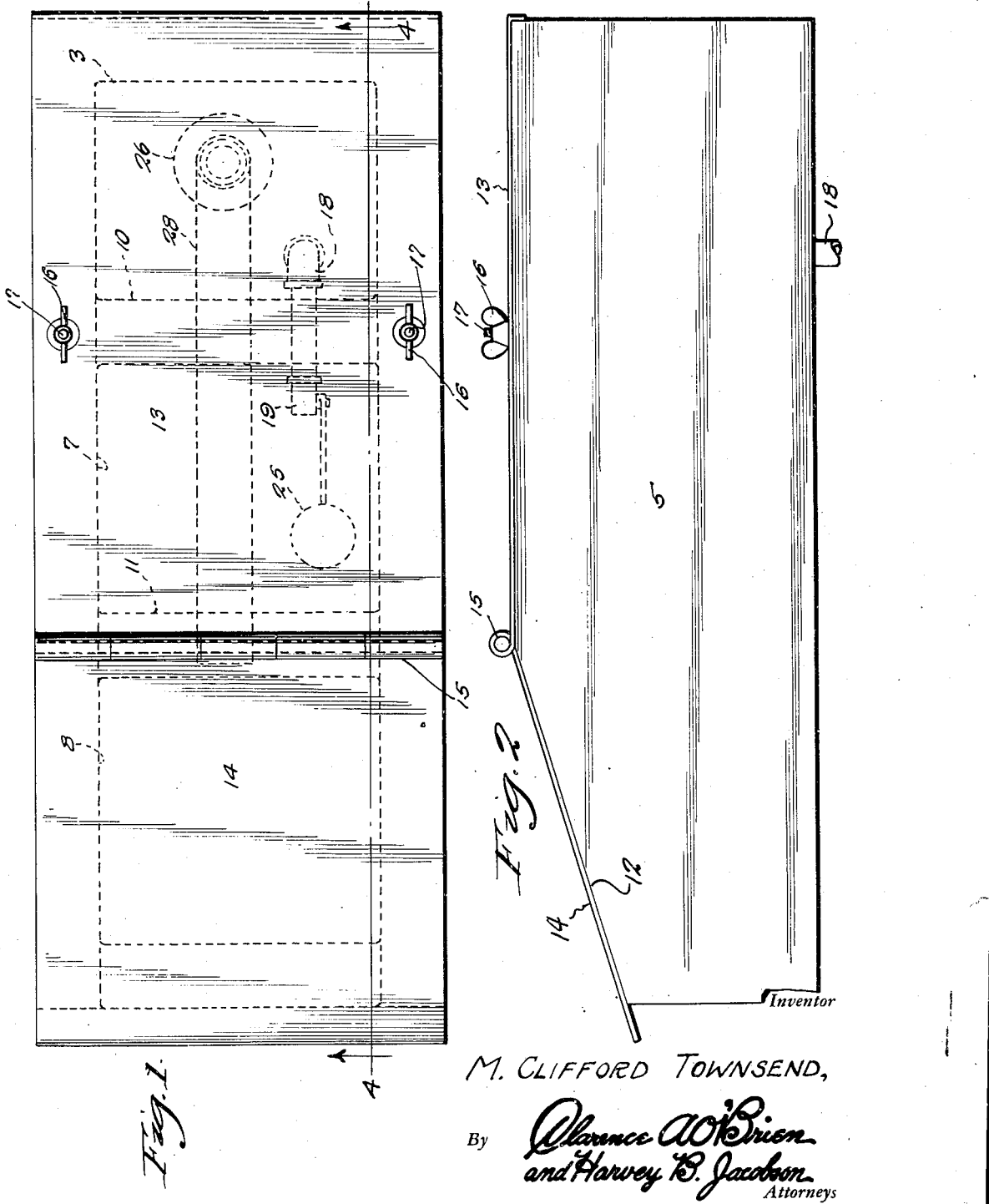
Inventor
M. CLIFFORD TOWNSEND,
By Clarence A. O'Brien
and Harvey B. Jacobson
Attorneys April 5, 1949. M. C. TOWNSEND 2,466,135
WATERING FOUNTAIN
Filed April 15, 1944 2 Sheets-Sheet 2
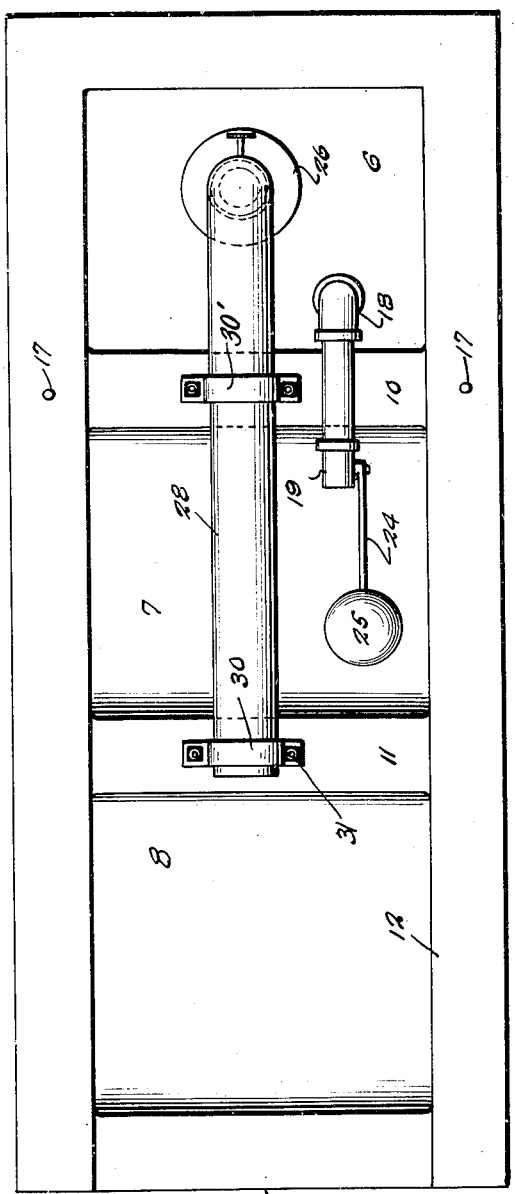
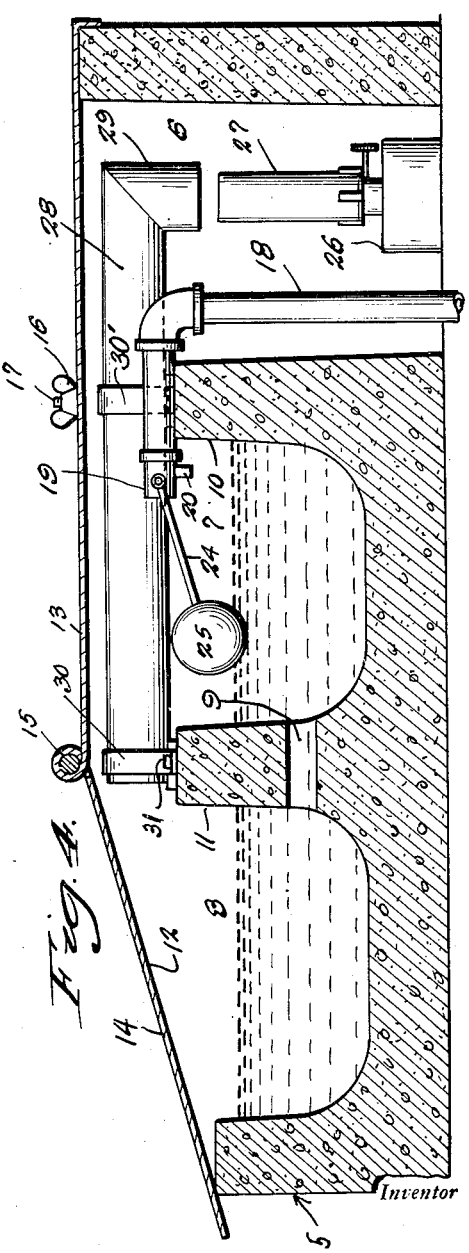
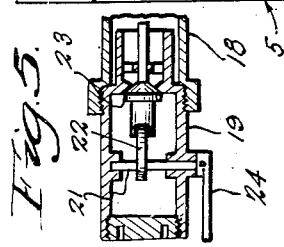
Inventor
M. CLIFFORD TOWNSEND,
By Clarence A. O'Brien
and Harvey B. Jacobson
Attorneys Patented Apr. 5, 1949

2,466,135

UNITED STATES PATENT OFFICE 2,466,135

WATERING FOUNTAIN

Maurice Clifford Townsend, Hartford City, Ind.

Application April 15, 1944, Serial No. 531,163

3 Claims. (Cl. 119—73)

This invention relates to a watering fountain especially designed for use by hogs.

The primary object of the present invention is to provide a watering fountain of the above kind which includes a drinking trough and a water supply trough which communicates with the drinking trough through a restricted passage, and wherein novel means are provided for preventing freezing of the water in cold weather, and undue warming of the water in hot weather, particularly in the drinking trough.

More specifically, the present invention aims to provide a watering fountain of the above kind which is comparatively simple in construction, efficient in use, and otherwise well adapted to meet with the requirements for a successful commercial use.

A further object of the present invention is to provide a watering fountain of the above kind embodying a rear heating chamber, an intermediate water supply trough, and a front drinking trough communicating with the water supply trough through a restricted passage, and wherein the heating chamber and water supply trough are constantly covered, whereas the drinking trough is effectively covered except when the hogs are drinking therefrom.

Still another object of the present invention is to provide a watering fountain of the above character wherein means is provided for conducting hot products of combustion and warm air from the heating chamber directly to the space between the water in the drinking trough and the cover for said drinking trough, thereby effectively preventing freezing of the water in the drinking trough in very cold weather without unduly heating the water therein.

Other objects and features of the present invention will become apparent from the following description when considered in connection with the accompanying drawings, and the invention consists in the novel form, combination and arrangement of parts hereinafter more fully described, shown in the drawings and claimed.

In the drawings, wherein like reference characters indicate corresponding parts throughout the several views:

Figure 1 is a top plan view of a drinking fountain constructed in accordance with the present invention.

Figure 2 is a side elevational view thereof.

Figure 3 is a view similar to Figure 1 with the cover of the fountain body removed.

Figure 4 is a vertical longitudinal section taken on line 4—4 of Figure 1.

Figure 5 is an enlarged horizontal section through the float valve for controlling the flow of water to the water supply trough.

Referring in detail to the drawings, the present watering fountain includes a horizontally elongated body 5 preferably formed of concrete so as to provide a rear heating chamber 6, an intermediate water supply trough 7, a front drinking trough 8, and a restricted passage 9 affording constant communication between the troughs 7 and 8 below the water level therein. It will be particularly noted that the partitions 10 and 11 which respectively divide the heating chamber 6 from the water supply trough 7 and the water supply trough 7 from the drinking trough 8, are of lesser height than the rear and side walls of the body 5, and the upper edges of the side walls at the drinking trough 8 are inclined forwardly and downwardly, as at 12, the front wall of body 5 being of slightly lesser height than the partitions 10 and 11. The heating chamber 6 is open at the top and may also be open at the bottom, as shown. As the body is formed of concrete with relatively thick walls, the water will not readily freeze in the troughs 7 and 8, except in unusually cold weather, if said troughs 7 and 8 are covered. I accordingly provide the body with a cover which may be made of any suitable material and which includes a rear portion 13 overlying the heating chamber 6 and the water supply trough 7 and resting upon the rear and side walls of the body 5, and a forward hinged lid section 14 overlying the drinking trough 8 and normally resting on the inclined upper edge portions 12 of the side walls of body 5 and the front wall of said body, as shown in Figure 4. The lid section 14 is hinged at 15 to the rear section 13 for vertical swinging movement, and at least the forward marginal portion of said lid section 14 projects outwardly beyond the adjacent walls of the body so that the hogs may root under the lid section 15 for opening it and obtaining access to the water in the drinking trough 8. It has been found in actual practice that hogs will do this, so that the drinking trough 8 may remain covered except when the hogs are drinking therefrom. The rear cover section 13 is preferably secured in place by means of nuts 16 threaded on the projecting upper ends of bolts 17 that are embedded in the side walls of the fountain body and that pass upwardly through openings in the section 13.

In order to have a supply of water constantly maintained in the water supply trough 7, and consequently also in the drinking trough 8 with which it communicates, there is provided a water supply means comprising a pipe 18 which extends from a source of water supply upwardly in the forward portion of the heating chamber 6 and then forwardly across the partition 10 where it terminates in a float valve 19 having a bottom discharge nozzle 20 disposed to discharge the water into the trough 7 at the rear of the latter. As shown in Figures 4 and 5, the float valve 19 may consist of a casing having a shaft 21 transversely journaled therein and provided with a cam 22 arranged to seat the valve head 23 against the pressure of the water, the shaft 21 having a projecting end on which is fixed one end of the arm 24 of a float 25. The arrangement is such that when the water attains a predetermined desired level in the trough 7, the float 25 will have risen sufficiently to close the valve head 23, and when the level of the water lowers below said predetermined desired level, the float 25 will lower and permit the valve head 23 to open. It will be apparent that the cover section 13 and partition 11 effectively prevent the hogs from coming in contact with the means for controlling the flow of water to the water supply trough 7.

While the cover 13, 14 will prevent chilling of the water in the troughs 7 and 8, by excluding cold drafts from the surface of the water in said troughs, under ordinary circumstances, it is necessary to heat the surface of the water, particularly in the drinking trough 8, to prevent freezing of the water in extremely cold weather. I provide a means for this purpose which will not materially heat the body of the water itself and thereby render the same germ-propagating and unpalatable. As shown, this includes a keorsene or like lamp 26 disposed in the lower portion of heating chamber 6 and provided with a chimney 27, and a conduit or flue 28 extending from the heating chamber 6 across the top of the trough 7 to the rear of the space above the water in drinking trough 8. The flue 28 has a downwardly directed rear end portion 29 that is disposed in spaced relation to and directly over the chimney 27 of lamp 26, and it will be apparent that the hot products of combustion from the lamp, together with surrounding warm air, will be conducted by the flue 28 forwardly for discharge directly into the space between the water in drinking trough 8 and its lid 14. While the warm products of combustion and air in this space will escape to some extent each time the lid section 14 is opened, the water in the drinking trough will be kept sufficiently warm at the surface to prevent freezing thereof under severely cold conditions. Also, there being no bottom in the heating chamber 6, a sufficient amount of fresh air will enter for insuring combustion of the fuel used in lamp 26. Still further, some of the warm air and hot products of combustion will pass from chamber 6 to the space above the water in the water supply trough 7, there being a free space for this purpose between the partitions 10 and 11 and the cover of the body 5. It is particularly noted that it is neither desired nor necessary to heat the water itself in the troughs 7 and 8. In other words, it is simply necessary to prevent undue chilling of the surface of the water in the troughs, thereby leaving the temperature of the bodies of water sufficiently low that the water will not be unhealthful and unpalatable to the animals. The flue 28 may be suitably fastened in place midway between the sides of the body 5 and upon the upper edges of the partitions 10 and 11, such as by means of clamping straps 30 and 30' passing over said flue and having their ends bolted down to the partitions 10 and 11, as at 31. Due to the inclination of lid section 14, it may be raised sufficiently for access to the water in the trough 8 without causing said lid section to approach a vertical raised position, thereby insuring gravitation of the same to closed position, when released.

From the foregoing description, it is believed that the construction and operation, as well as the advantages of the present invention, will be readily understood and appreciated by those skilled in the art. Minor changes in details of construction illustrated and described are contemplated, such as fairly fall within the spirit and scope of the invention as claimed. The walls of the fountain can be easily insulated with straw or other cheap material to help maintain the water at an even and desirable temperature, and the concrete walls will not rot or rust when so insulated. The cover shields the water from the sun and hot air in hot weather to prevent undue warming of the water in such weather.

What I claim is:

1. A hog watering fountain including an elongated open-top body formed with transverse partitions to provide a front drinking trough, an intermediate water supply trough and a rear heating chamber, one of said partitions having a restricted passage affording constant communication between said troughs below the water level therein, means including a float valve for maintaining a constant supply of water in the water supply trough, a cover for the body having a top wall resting on the sides and rear end of the body and including a flat fixed section disposed above the water supply trough and the heating chamber and a freely swinging vertically movable lid section hinged directly to said fixed section and overlying the drinking trough, the upper edges of said partitions being spaced from the cover, said movable lid section having a front marginal portion projecting outwardly beyond the body adapted to be opened by a rooting action of the hogs under the same, and a heater in said heating chamber.

2. A hog watering fountain including an elongated open-top body formed with transverse partitions to provide a front drinking trough, an intermediate water supply trough and a rear heating chamber, one of said partitions having a restricted passage affording constant communication between said troughs below the water level therein, means including a float valve for maintaining a constant supply of water in the water supply trough, and a cover for the body having a top wall resting on the sides and rear end of the body and including a fixed section disposed above the water supply trough and the heating chamber and a freely swinging vertically movable lid section hinged to said fixed section and overlying the drinking trough, the upper edges of said partitions being spaced from the cover, said movable lid section having a front marginal portion projecting outwardly beyond the body adapted to be opened by a rooting action of the hogs under the same, a source of supply of a gaseous heating medium in said heating chamber, and a horizontal flue secured on the partitions for conducting said gaseous heating medium from said source and discharging the same directly into the space between the lid section and the surface of the water in the drinking trough.

3. A hog watering fountain comprising a body formed with transverse partitions to provide a rear heating chamber, an intermediate water supply trough, and a front drinking trough, one of said partitions having a restricted passage affording constant communication between the water supply trough and the drinking trough below the water level therein, means including a float valve for maintaining a constant supply of water in the water supply trough, a lamp in the heating chamber, a cover for the body including a fixed rear section having a top wall resting on the sides and rear end of the body and overlying the heating chamber and the water supply trough and a freely swinging vertically movable lid section hinged to the fixed section and overlying the drinking trough, said lid section having a front marginal portion projecting outwardly beyond the body and adapted to be opened by a rooting action of the hogs under the same, said partitions being spaced from said cover, and a conduit secured on said partitions and extending from the heating chamber across the water supply trough and discharging into the space between the lid section and the surface of the water in the drinking trough.

M. CLIFFORD TOWNSEND.

REFERENCES CITED

The following references are of record in the file of this patent:

UNITED STATES PATENTS

| Number | Name | Date |
|---|---|---|
| 1,307,521 | Shaffer | June 24, 1919 |
| 1,497,202 | Belden | June 10, 1924 |
| 1,640,292 | Petrick | Aug. 23, 1927 |
| 1,649,009 | Zachte | Nov. 15, 1927 |